(12) United States Patent
Duarte

(10) Patent No.: US 8,060,836 B2
(45) Date of Patent: Nov. 15, 2011

(54) NAVIGATING DISPLAYED CONTENT ON A MOBILE DEVICE

(75) Inventor: Matias Duarte, Los Angeles, CA (US)

(73) Assignee: Virgin Mobile USA, LLC, Warren, NJ (US)

( * ) Notice: Subject to any disclaimer, the term of this patent is extended or adjusted under 35 U.S.C. 154(b) by 508 days.

(21) Appl. No.: 11/724,996

(22) Filed: Mar. 16, 2007

(65) Prior Publication Data

US 2008/0168385 A1 Jul. 10, 2008

Related U.S. Application Data

(60) Provisional application No. 60/879,231, filed on Jan. 8, 2007.

(51) Int. Cl.
*G06F 3/00* (2006.01)

(52) U.S. Cl. ......... 715/784; 715/785; 715/786; 715/787

(58) Field of Classification Search ........... 715/784–787
See application file for complete search history.

(56) References Cited

U.S. PATENT DOCUMENTS

| | | |
|---|---|---|
| 5,333,247 A | 7/1994 | Gest et al. |
| 6,057,840 A | 5/2000 | Durrani et al. |
| 6,069,626 A | 5/2000 | Cline et al. |
| 6,366,302 B1 * | 4/2002 | Crosby et al. ............... 715/786 |
| 6,683,626 B1 | 1/2004 | Abellera |
| 6,816,174 B2 * | 11/2004 | Tiongson et al. ........... 715/787 |
| 6,839,575 B2 * | 1/2005 | Ostergaard ................. 455/566 |
| 6,907,575 B2 | 6/2005 | Duarte |
| 7,082,577 B1 | 7/2006 | Brosnahan |
| 7,610,556 B2 * | 10/2009 | Guo et al. .................. 715/745 |
| 2003/0107603 A1 | 6/2003 | Clapper |
| 2004/0100479 A1 * | 5/2004 | Nakano et al. .............. 345/700 |
| 2005/0091604 A1 * | 4/2005 | Davis ......................... 715/772 |
| 2006/0253791 A1 * | 11/2006 | Kuiken et al. .............. 715/766 |
| 2007/0226645 A1 * | 9/2007 | Kongqiao et al. .......... 715/781 |
| 2008/0168386 A1 * | 7/2008 | Brinda et al. ............... 715/786 |
| 2008/0168478 A1 * | 7/2008 | Platzer et al. .............. 719/328 |
| 2010/0026631 A1 * | 2/2010 | Pletikosa .................... 345/169 |

OTHER PUBLICATIONS

PCT International Search Report and Written Opinion, PCT/US2008/000068, Jan. 28, 2009, 11pages.

* cited by examiner

*Primary Examiner* — Ryan Pitaro

(57) ABSTRACT

Methods and systems are provided for displaying scrollable information with an improved indicator of relative position. Certain embodiments may be use a focus element that indicates, by its relative position within the display, the relative position of the scrollable information displayed.

16 Claims, 5 Drawing Sheets

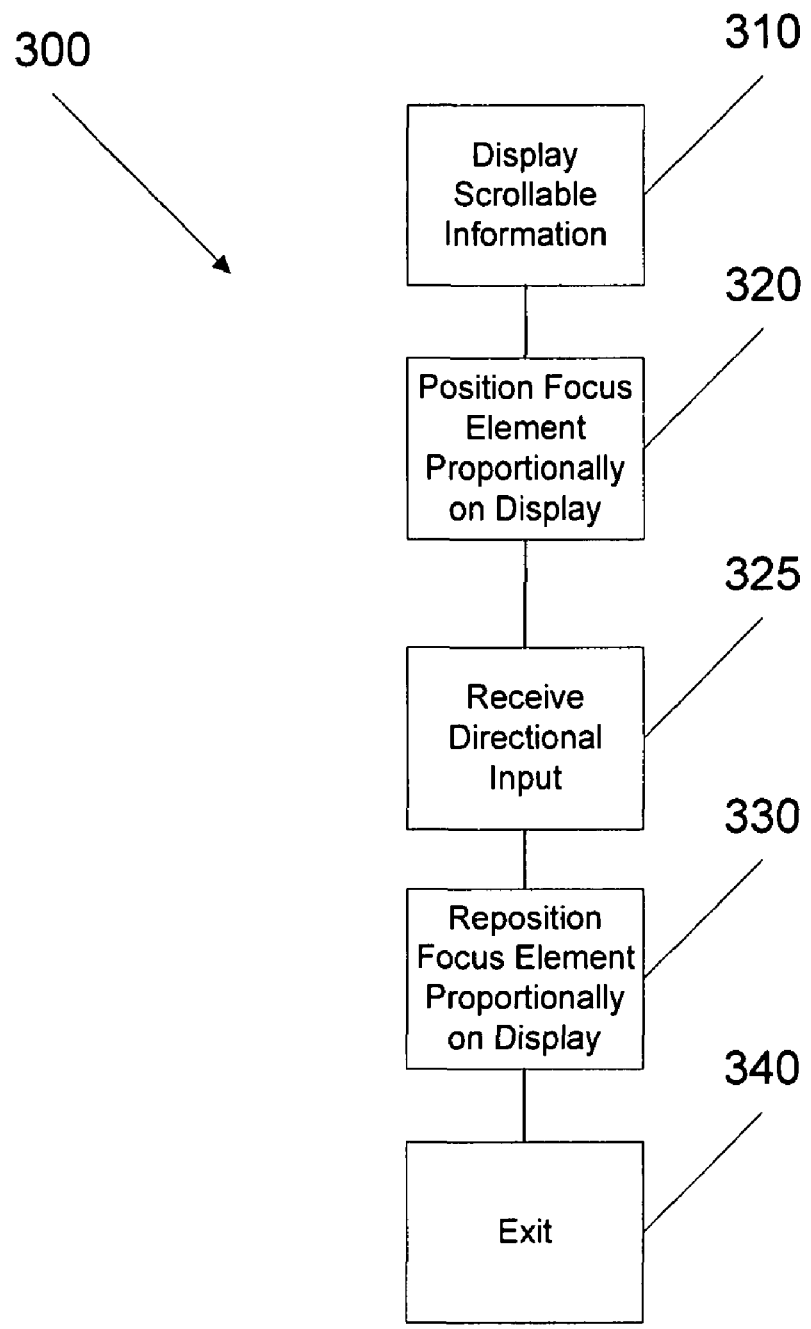

NAVIGATING DISPLAYED CONTENT ON A MOBILE DEVICE

CROSS REFERENCE TO RELATED APPLICATIONS

This application claims the benefit of U.S. Provisional Patent Application No. 60/879,231 filed Jan. 8, 2007 the entire disclosure of which is incorporated herein by reference.

FIELD OF INVENTION

The present invention relates generally to user interfaces for mobile electronic communications and, more particularly, to a system and method for displaying scrollable information with an improved indicator of relative position.

BACKGROUND OF THE INVENTION

Often more content needs to be displayed on one "page" than will fit on a given screen. User interfaces overcome this by allowing users to "scroll" around a page in vertical and horizontal dimensions. However allowing users to scroll can create some additional problems. For example, at any given time a display needs to let the user know that they can scroll in a given direction. In that regard, the display needs to indicate whether a user may scroll up or down in the middle of a document, down at the top of a webpage, or left at the start of a spread sheet. The display may also need to inform the user of the current cursor position relative to the entire distance that can be scrolled. Additionally, a display may give the user "affordances" to actually scroll and manipulate the display (e.g. pressing "page down" key or click and drag the "thumb" on the scrollbar). Traditionally these problems have been overcome with traditional "scroll bars" at the side however these may be inadequate for a variety of reasons.

Traditional scroll bars use up valuable screen real estate and prevent the user from reading the content and monitoring the relative position at the same time. In the context of a mobile device the problem of screen real estate becomes even more critical because your physical screen is small (even if your resolution increases). Additionally, a user's eye must (and typically does) jump from the content in question to the scroll bar. This jumping of focus point back and forth slows down interaction and puts additional strain on the user's eyes.

SUMMARY OF THE INVENTION

Embodiments of the present invention provide systems and methods for navigating electronic content on a display.

One embodiment of the present invention includes a mobile electronic device having a processor and a storage medium which contains scrollable information. The device also includes a memory for storing computer readable instructions that cause the processor to display the scrollable information in a display of the mobile electronic device and to indicate a relative position of the scrollable information by a relative position of a focus element within the display.

In another embodiment, a method of displaying information is presented. The method includes displaying scrollable information on a display of an electronic device. The display includes a focus element. The method further includes an indicator of a relative position of the scrollable information by a relative position of the focus element.

In yet another embodiment, a method of displaying scrollable information on a display of an electronic device, wherein the display includes a prominent pane and a non-prominent pane. The method further includes an indicator of a relative position of the scrollable information by a relative position of the prominent pane within the display.

BRIEF DESCRIPTION OF THE DRAWINGS

These embodiments and other aspects of this invention will be readily apparent from the detailed description below and the appended drawings, which are meant to illustrate and not to limit the invention, and in which:

FIG. 5 is a high-level flow chart illustrating exemplary steps involved in practicing an embodiment of the present invention.

DETAILED DESCRIPTION OF THE PREFERRED EMBODIMENTS

The present invention will be more completely understood through the following detailed description, which should be read in conjunction with the attached drawings. In this description, like numbers refer to similar elements within various embodiments of the present invention. Within this detailed description, the claimed invention will be explained with respect to preferred embodiments. However, the skilled artisan will readily appreciate that the methods and systems described herein are merely exemplary and that variations can be made without departing from the spirit and scope of the invention.

Embodiments of the present invention relate to a system and method for displaying scrollable information with a focus element that indicates, by its relative position within the display, the relative position of the scrollable information displayed.

In the following discussion of illustrative embodiments, the "mobile device" includes, without limitation, mobile phones, personal digital assistants, hand-held computers, ultra-mobile personal computers, and the like. As used herein, a "focus element" is an object that has associated with it a focus item or a component of a focus item. A focus element is typically a building block, such as a frame, background color or text element, from which more complicated focus items may be constructed. The term "scroll," as used herein, means to move displayed information horizontally and/or vertically within a display window in order to view more of the scrollable information, because the displayed information is otherwise truncated in the horizontal and/or vertical directions.

Figure 1:
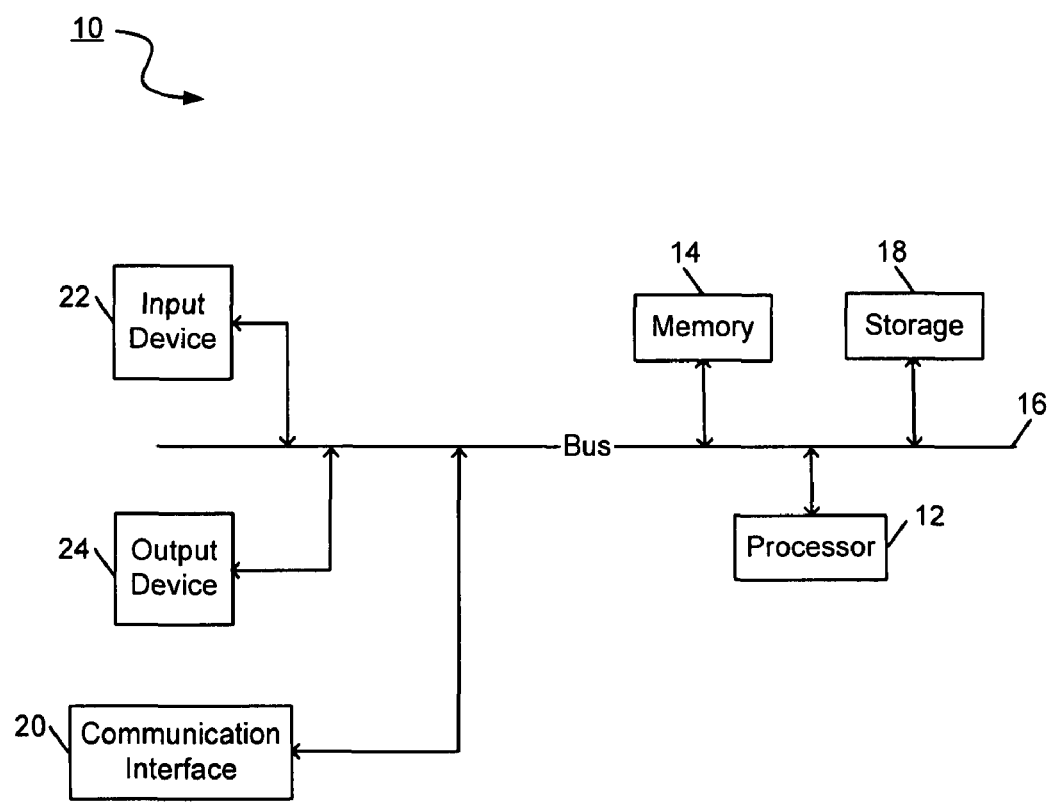
FIG. 1 is a functional block diagram that illustrates the components of an exemplary system for practicing an embodiment of the present invention.

Turning now to FIG. 1, a functional block diagram illustrates the components of an exemplary mobile device 10 for practicing an embodiment of the present invention. Mobile device 10 preferably includes a processing unit 12, a system memory 14, a disk storage 18, a communication interface 20, an input device 22, an output device 24, and a system bus 16. System bus 16 couples system components including, but not limited to, system memory 14 to processing unit 12. The processing unit 12 can be any of various available processors.

Input device 22 may be a keyboard, thumbboard, or touchscreen (for use with a stylus) that are used to receive data from a user. In addition, input device 22 can also include a plurality of other inputs or controls for adjusting and configuring one or more aspects of the present invention including voice commands. Output device 24 may be a display device, such as an LCD or LED display screen, that can display one or more display objects (not shown) such as configurable icons, buttons, input boxes, menus, tabs, softkey labels and so forth having multiple configurable dimensions, shapes, colors, text, data and sounds to facilitate operations with mobile device 10.

Communication interface 20 facilitates data exchange over a variety of wireless networks. The hardware and software necessary for connection to the communication interface 20 includes, for exemplary purposes only, internal and external components that transmit and receive data wirelessly across a plurality of standard protocols including, for example, PCS, GSM, CDMA, Bluetooth, WiFi, IrDA, WiMAX, WiBRO or through other known wireless standards.

Storage 18 may include removable or fixed, volatile or non-volatile or permanent or re-writable computer storage media. The computer readable medium can be any available medium that can be accessed by a general purpose or special purpose mobile device. By way of example, and not limitation, such a computer readable medium can comprise flash memory, RAM, ROM, electrically erasable programmable read only memory (EEPROM), optical disk storage, magnetic disk storage or other magnetic storage devices, or any other medium that can be used to store digital information on a mobile device.

It is to be appreciated that FIG. 1 describes software that acts as an intermediary between users and the basic resources described in mobile device 10. Such software preferably includes an operating system. The operating system, which can be resident in storage 18, acts to control and allocate resources of mobile device 10. System applications take advantage of the management of resources by the operating system through program modules and program data stored either in system memory 14 or on disk storage 18. Furthermore, it is to be appreciated that the present invention can be implemented with various operating systems or combinations of operating systems.

The computer readable medium tangibly embodies a program, functions, and/or instructions that cause the computer system to operate in a specific and predefined manner as described herein. Those skilled in the art will appreciate, however, that the process described below, such as the process illustrated in FIG. 5, may be implemented at any level, ranging from hardware to application software and in any appropriate physical location. For example, the present invention may be implemented as software code to be executed by mobile device 10 using any suitable computer language and may be stored on any of the storage media described above, or can be configured into the logic of mobile device 10. Such software code may be executed by mobile device 10 using any suitable computer language such as, for example, Java, Javascript, C++, C, C#, Perl, Visual Basic, Transact/Structure Query Language (T/SQL), database languages, APIs, various system-level SDKs, assembly, firmware, microcode, and/or other languages and tools.

These are representative components of a mobile device whose operation is well understood. Furthermore, those of ordinary skill in the art will appreciate that mobile device 10 of FIG. 1 is exemplary only and that the present invention can operate within a number of different mobile devices.

Figure 2:
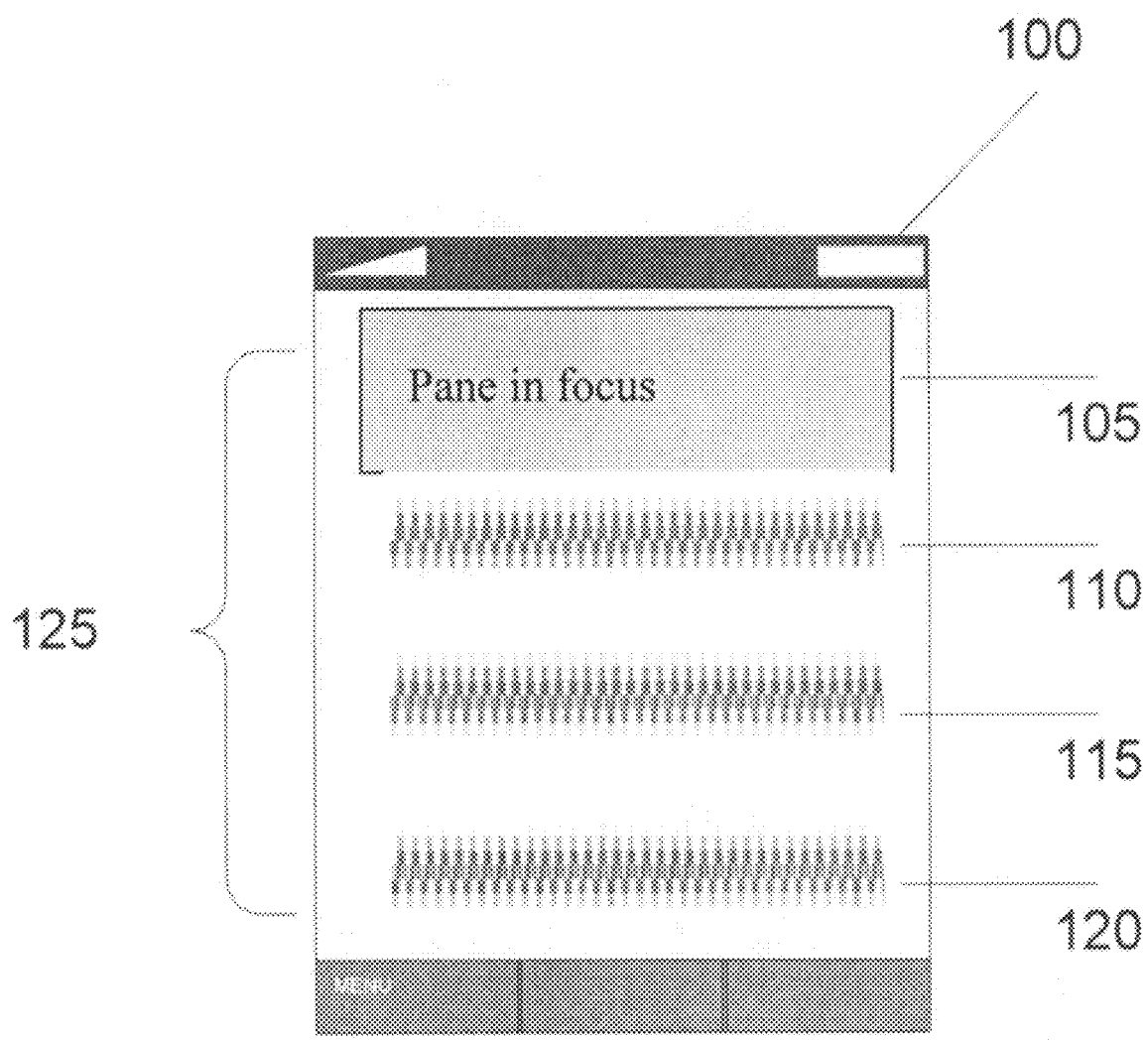
FIG. 2 is a schematic diagram that illustrates an exemplary display of a mobile device according to an embodiment of the present invention.

FIG. 2 is schematic diagram that illustrates a user interface 100 configured to display scrollable information with a focus element that indicates, by its relative position within the display, the relative position of the scrollable information displayed according to an embodiment of the present invention. User interface 100 includes panes 105, 110, 115 and 120 that display information 125. As illustrated, pane 105 is focused, while panes 110, 115 and 120 are unfocused. Note that the focus element, pane 105, is at the top of the display, indicating that the top of the scrollable information is displayed.

Figure 3:
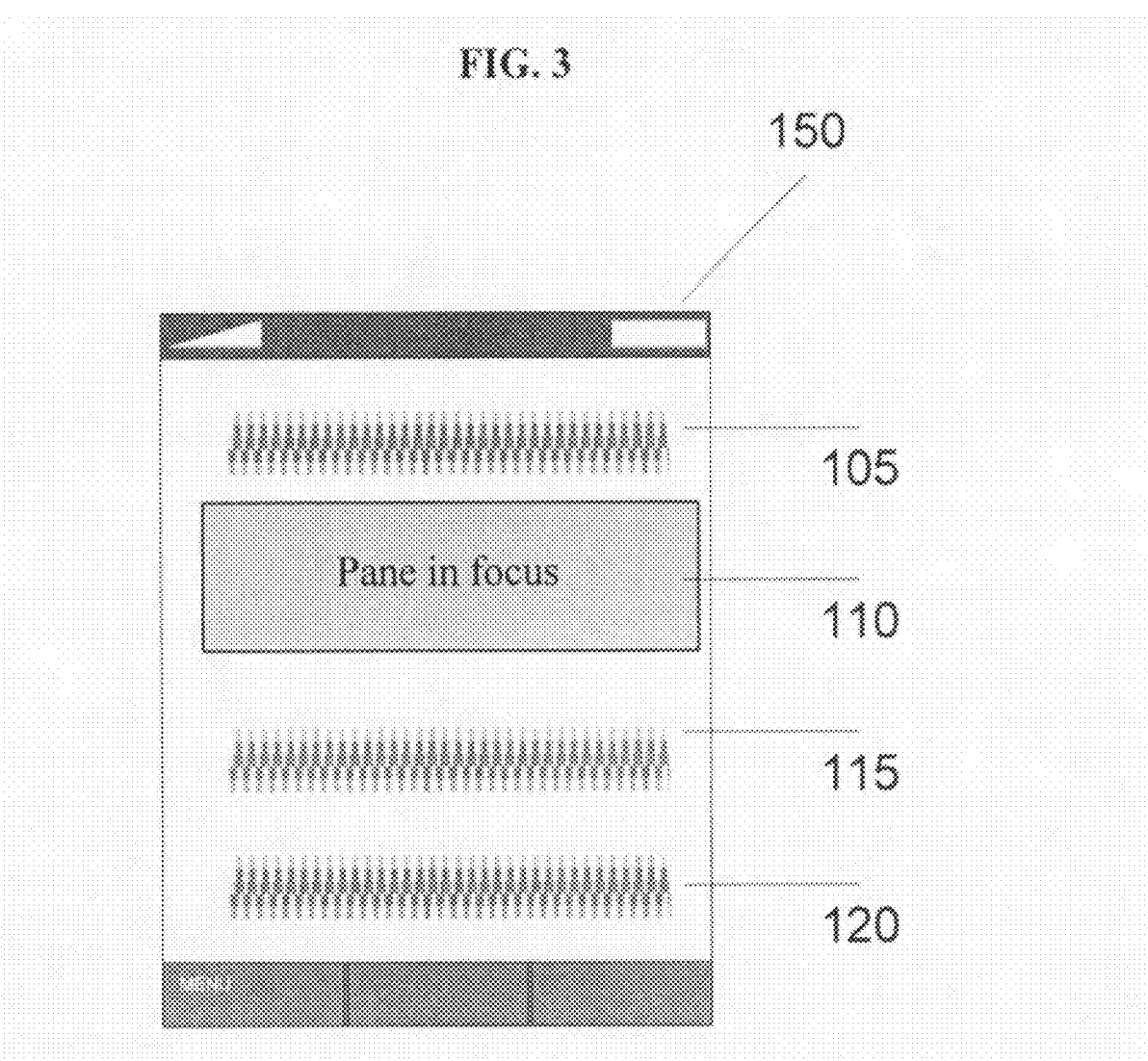
FIG. 3 is a schematic diagram that illustrates an exemplary display screen according to an embodiment of the present invention.

FIG. 3 is a schematic diagram that illustrates a user interface 150 that is similar in many respects to user interface 100 except that pane 110 is focused and panes 105, 115 and 120 are unfocused. Note that the focus element, pane 110, is positioned above the vertical midpoint but below the top of the display to indicate the relative position of scrollable information visible in the display. In this embodiment, the focus element moves from the top to the bottom of the display in the same way that a scroll bar "thumb" would move in its scroll track.

Figure 4:
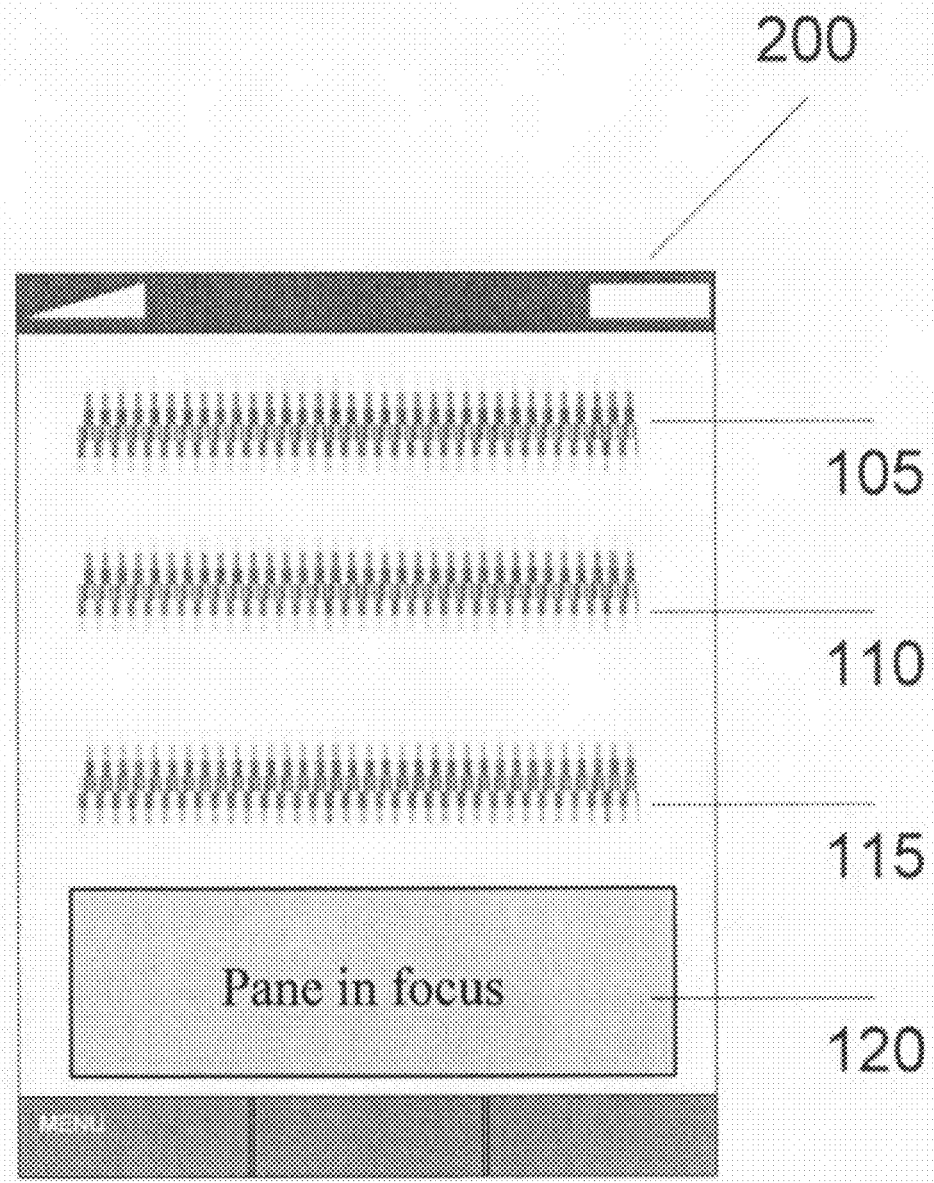
FIG. 4 is a schematic diagram that illustrates an exemplary display screen according to an embodiment of the present invention.

FIG. 4 is a schematic diagram that illustrates a user interface 200 that is similar in many respects to user interfaces 100 and 150 except that pane 120 is focused and panes 105, 110, and 115 are unfocused. Note that the focus element, pane 120, is positioned at the bottom of the display to indicate the relative position of scrollable information visible in the display. In this embodiment, the focus element moves from the top to the bottom of the display in the same way that a scroll bar "thumb" would move in its scroll track. As indicated by the relative position of pane 120, containing the in focus element, the bottom of the scrollable information is displayed.

The focus element may be used in a variety of ways known to those skilled in the art to indicate the relative position of scrollable information visible in a display device. For example, the text within the focus element may be focused while the text outside of the focus element is unfocused. In some embodiments the use of highlighting, brighter backgrounds, larger panes, or other visual techniques may be implemented to carry out relative positioning principles of the present invention.

A display device, such as mobile device 10, may also be configured to indicate a scrollable direction by fading the pane in that direction. For example, in a display of vertically scrollable information the bottom or top panes may be faded to indicate additional scrollable information in that direction.

Turning now to FIG. 5, a flow diagram of an exemplary method 300 for displaying scrollable information on an electronic device is depicted according to an embodiment of the present invention. Method 300 begins in step 310 when scrollable information is displayed, in part, on a display device, such as mobile device 10. In step 320, a focus element is positioned to indicate the relative position of the scrollable information. For example, in an embodiment in which the top of the scrollable information is initially displayed, the focus element abutted against the top of the display. In step 325, directional input is received, such as by a user browsing the scrollable information by moving the focus element around the display of the device, such as with input device 22 or any other suitable control means, such as a scrollwheel, a thumbpad, directional keys, click-and-drag with a stylus. In response, in step 325, the focus element is repositioned within the display to reflect the relative position of the focus element. For example, if the user had scrolled to a point halfway through the scrollable information, the focus element would be positioned in at the vertical midpoint of the display. The user may continue to scroll through the information in up/down, left/right, or diagonally depending on the device and the information displayed. When the focus element is located at a perimeter of the display, the user may either exit 340, or continue to scroll in a different direction.

Variations, modifications, and other implementations of what is described herein will occur to those of ordinary skill in the art without departing from the spirit and scope of the invention as claimed. Accordingly, the invention is to be defined not by the preceding illustrative description but instead by the spirit and scope of the following claims.

The invention claimed is:

1. A mobile electronic device comprising:
a display screen;
an input interface;
a processor, coupled to the display and the input interface; and
a memory storing computer readable instructions that, when executed by the processor, cause the processor to:
display a portion of a document in the display screen of the mobile electronic device, the document including scrollable information, wherein the displayed portion of the document defines a scroll position within the document of the displayed portion of the document, the displayed portion of the document faded at an edge of the display screen to indicate a scrollable direction,
display a focus element overlaying a pane of the displayed portion of the document, wherein the position of the displayed focus element in the display screen corresponds to the scroll position of the displayed portion of the document, to indicate the scroll position within the document of the displayed portion of the document, and wherein the pane substantially extends across the screen in a direction orthogonal to the scrollable direction,
receive user inputs via an input interface of the device to scroll the document in the display screen, and
responsive to the user inputs, scroll the document in the display screen and adjusting the position of the focus element in the display screen to correspond to the scroll position of the displayed portion of the document.

2. The electronic device of claim 1, wherein the position of the displayed focus element in the display screen indicates a vertical scroll position within the document of the displayed portion of the document.

3. The electronic device of claim 1, wherein the position of the displayed focus element in the display screen indicates a horizontal scroll position within the document of the displayed portion of the document.

4. The device of claim 1, wherein the memory further stores computer readable instructions that, when executed by the processor, cause the processor to display the portion of the document in the display screen using a visual technique wherein the pane of the document that is within the focus element has a distinct appearance from the portion of the document that is outside the focus element.

5. The device of claim 4, wherein the visual technique includes at least one of: focusing, highlighting, and background colors.

6. A method comprising:
displaying scrollable information in a display screen of an electronic device, wherein the display screen displays less than all of the scrollable information at a time, the displayed scrollable information faded in a direction in which the scrollable information can be scrolled;
displaying a focus element on the display screen, the focus element overlaying a pane of the displayed scrollable information on the display screen, wherein the focus element is positioned within the display screen such that a relative position of the focus element with respect to the display screen corresponds to a relative position of the displayed scrollable information with respect to the entire scrollable information, and wherein the pane substantially extends across the screen in a direction orthogonal to the scrolling direction;
receiving a user input via an input interface of the device to scroll the scrollable information; and
responsive to the user input,
scrolling the scrollable information so that a different portion of the scrollable information is displayed on the display screen, and
moving the displayed focus element within the display screen so that the relative position of the focus element with respect to the display screen corresponds to a relative position of the displayed different portion of the scrollable information with respect to the entire scrollable information.

7. The method of claim 6, wherein the relative position of the focus element with respect to the display screen indicates a vertical position of the displayed scrollable information with respect to the entire scrollable information.

8. The method of claim 6, wherein the relative position of the focus element with respect to the display screen indicates a horizontal position of the displayed scrollable information with respect to the entire scrollable information.

9. The method of claim 6, wherein the scrollable information comprises text.

10. The method of claim 6, wherein displaying the scrollable information in the display screen comprises displaying the scrollable information that is within the focus element in a focused state and displaying the scrollable information that is outside the focus element in an unfocused state.

11. The method of claim 6, wherein displaying the scrollable information in the display screen comprises using a visual technique wherein the scrollable information that is within the focus element has a distinct appearance from the scrollable information that is outside the focus element.

12. The method of claim 11, wherein the visual technique includes at least one of highlighting and background colors.

13. A method comprising:
displaying a portion of a document in a display screen of an electronic device, the document including scrollable information, wherein the displayed portion of the document defines a scroll position within the document of the displayed portion of the document, the displayed portion of the document faded in a direction in which the document can be scrolled;
displaying a focus element overlaying a pane of the displayed portion of the document, wherein the position of the displayed focus element in the display screen corresponds to the scroll position of the displayed portion of the document, to indicate the scroll position, and wherein the pane substantially extends across the screen in a direction orthogonal to the scrolling direction;
receiving user inputs via an input interface of the device to scroll the document in the display screen; and
responsive to the user inputs, scrolling the document in the display screen and adjusting the position of the focus element in the display screen to correspond to the scroll position of the displayed portion of the document.

14. The method of claim 13, wherein the scrollable information in the document comprises text.

15. The method of claim 13, wherein displaying the portion of the document in the display screen comprises using a visual technique wherein the pane of the document that is within the focus element has a distinct appearance from the portion of the document that is outside the focus element.

16. The method of claim 15, wherein the visual technique includes at least one of: focusing, highlighting, and background colors.

* * * * *